US009972352B2

(12) United States Patent
Nolan et al.

(10) Patent No.: US 9,972,352 B2
(45) Date of Patent: May 15, 2018

(54) ANTIFERROMAGNETIC COUPLING LAYERS

(75) Inventors: Thomas P. Nolan, Fremont, CA (US); Bogdan F. Valcu, Fremont, CA (US); Li Tang, Fremont, CA (US)

(73) Assignee: Seagate Technology LLC, Cupertino, CA (US)

( * ) Notice: Subject to any disclaimer, the term of this patent is extended or adjusted under 35 U.S.C. 154(b) by 767 days.

(21) Appl. No.: 12/544,091

(22) Filed: Aug. 19, 2009

(65) Prior Publication Data

US 2011/0043939 A1    Feb. 24, 2011

(51) Int. Cl.
G11B 5/667    (2006.01)
G11B 5/82    (2006.01)

(52) U.S. Cl.
CPC ............... *G11B 5/82* (2013.01); *G11B 5/667* (2013.01)

(58) Field of Classification Search
CPC .................................. G11B 5/667; G11B 5/82
See application file for complete search history.

(56) References Cited

U.S. PATENT DOCUMENTS

| | | |
|---|---|---|
| 5,180,609 A | 1/1993 | Nakamura et al. |
| 5,580,667 A | 12/1996 | Lai et al. |
| 5,942,342 A | 8/1999 | Hikosaka et al. |
| 6,641,935 B1 | 11/2003 | Li et al. |

(Continued)

FOREIGN PATENT DOCUMENTS

| | | |
|---|---|---|
| CN | 1767008 | 5/2006 |
| CN | 1979644 | 6/2007 |
| JP | 2008077765 | 4/2008 |

OTHER PUBLICATIONS

International Searching Authority, U.S. Patent and Trademark Office; International Search Report for PCT/US2010/046010; dated May 6, 2011, 2 pages.

(Continued)

*Primary Examiner* — Holly Rickman
*Assistant Examiner* — Lisa Chau
(74) *Attorney, Agent, or Firm* — Hollingsworth Davis, LLC

(57) ABSTRACT

Methods and media structures are provided for increasing writability and reducing unintentional erasure of perpendicular magnetic recording media. Variable permeability is controlled within a thin soft underlayer (SUL) structure, independent of bulk SUL material properties such as magnetic moment ($B_s$) and magnetic anisotropy (Hk). Media with an improved combination of easier writability on the recorded track and difficult erasure off-track (between tracks and on neighboring tracks) is achieved, in part, by an unbalanced antiferromagnetically coupled (AFC) SUL structure. A permeability gradient is established within the soft underlayer with layers having different values of permeability and magnetic thickness ($B_s*t$). In an aspect, a first SUL layer includes a high permeability region and an overlying low permeability region. A second layer antiferromagnetically couples the first layer to a low permeability third SUL layer. The present invention may be utilized with high density perpendicular recording media requiring carefully balanced magnetic properties.

20 Claims, 7 Drawing Sheets

(56) References Cited

U.S. PATENT DOCUMENTS

| | | | |
|---|---|---|---|
| 6,731,458 | B2 | 5/2004 | Watanabe et al. |
| 6,778,358 | B1 | 8/2004 | Jiang et al. |
| 6,788,358 | B1 | 9/2004 | Jiang et al. |
| 6,818,330 | B2 | 11/2004 | Shukh et al. |
| 6,828,785 | B2 | 12/2004 | Hosomi et al. |
| 6,835,475 | B2 | 12/2004 | Carey et al. |
| 6,890,667 | B1 | 3/2005 | Lairson et al. |
| 7,106,539 | B2 | 9/2006 | Aoyanagi et al. |
| 7,199,985 | B1 | 4/2007 | Sato et al. |
| 7,241,516 | B1 | 7/2007 | Acharya |
| 7,378,164 | B1 | 5/2008 | Lairson et al. |
| 7,601,443 | B2 | 10/2009 | Lim et al. |
| 7,901,802 | B2 | 3/2011 | Zhou et al. |
| 8,277,962 | B2 | 10/2012 | Zhou et al. |
| 2002/0058160 | A1 | 5/2002 | Oikawa et al. |
| 2002/0127433 | A1* | 9/2002 | Shimizu et al. ....... 428/694 TM |
| 2003/0035973 | A1 | 2/2003 | Trindale et al. |
| 2004/0224184 | A1 | 11/2004 | Hikosaka et al. |
| 2005/0008902 | A1 | 1/2005 | Bertero et al. |
| 2005/0089726 | A1 | 4/2005 | Abarra |
| 2005/0146803 | A1 | 7/2005 | Kim et al. |
| 2006/0093865 | A1 | 5/2006 | Lim et al. |
| 2006/0147758 | A1 | 7/2006 | Jung et al. |
| 2006/0257677 | A1 | 11/2006 | Choi et al. |
| 2007/0065681 | A1* | 3/2007 | Girt et al. ..................... 428/828 |
| 2007/0183923 | A1 | 8/2007 | Choi et al. |
| 2007/0217074 | A1* | 9/2007 | Zhou et al. .................. 360/135 |
| 2007/0287031 | A1 | 12/2007 | Nolan et al. |
| 2008/0070063 | A1 | 3/2008 | Ibusiki et al. |
| 2010/0328818 | A1 | 12/2010 | Zhou et al. |

OTHER PUBLICATIONS

International Searching Authority, U.S. Patent and Trademark Office; International Preliminary Report on Patentability; PCT/US2010/046010; dated Feb. 21, 2012, 6 pages.

U.S. Appl. No. 12/353,229, filed Jan. 13, 2009 (not yet published).

Apr. 25, 2014, File History for U.S. Appl. No. 13/620,324.

Fohse et al., "Optimizing the Magnetic Properties of Electroplated Permalloy for Flux Guides in Micromotors", 7th International Symposium on Magnetic Materials, Oct. 2002, 1 page.

File History for U.S. Appl. No. 13/620,324.

File History for U.S. Appl. No. 11/686,865.

File History for U.S. Appl. No. 12/879,849.

Acharya et al., "Anti-Parallel Coupled Soft Under Layers for High-Density Perpendicular Recording", IEEE Transactions on Magnetics, vol. 40, No. 4, Jul. 2004, pp. 2383-2385.

Monson et al., "Effective Permeability of Soft Magnetic Layers Adjacent to Recorded Media", IEEE Transactions on Magnetics, vol. 38, No. 5, Sep. 1999, 3 pages.

International Search Report and Written Opinion dated May 6, 2011 for PCT Application No. PCT/US2010/046010, 8 pages.

International Preliminary Report on Patentability dated Mar. 1, 2012 for PCT Application No. PCT/US2010/046010, 7 pages.

Office Action dated Jun. 24, 2014 for Japanese Application No. 2012-525688, 3 pages.

Office Action dated Jun. 4, 2014 for Chinese Application No. 201080037287.5, 23 pages.

Office Action dated Feb. 16, 2015 for Chinese Application No. 201080037287.5, 19 pages.

Office Action dated Sep. 30, 2015 for Chinese Application No. 201080037287.5, 12 pages.

Office Action dated Feb. 26, 2016 for Chinese Application No. 201080037287.5, 8 pages.

Office Action dated Jun. 22, 2016 for Chinese Application No. 201080037287.5, 4 pages.

Office Action dated Apr. 27, 2015 for Japanese Application No. 2012-525688, 3 pages.

Office Action dated Jun. 27, 2015 for Japanese Application No. 2012-525688, 3 pages.

Office Action dated Jun. 28, 2016 for Japanese Application No. 2015-160098, 2 pages.

Office Action dated Oct. 31, 2014 for Malaysian Application No. PI2012000665, 4 pages.

\* cited by examiner

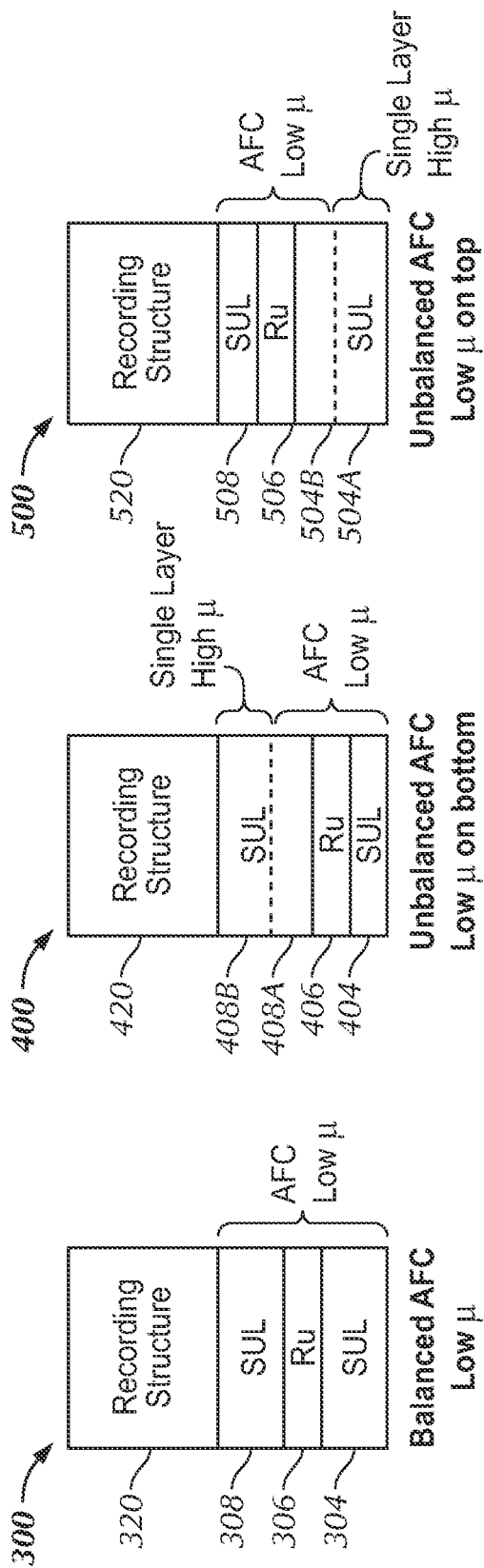

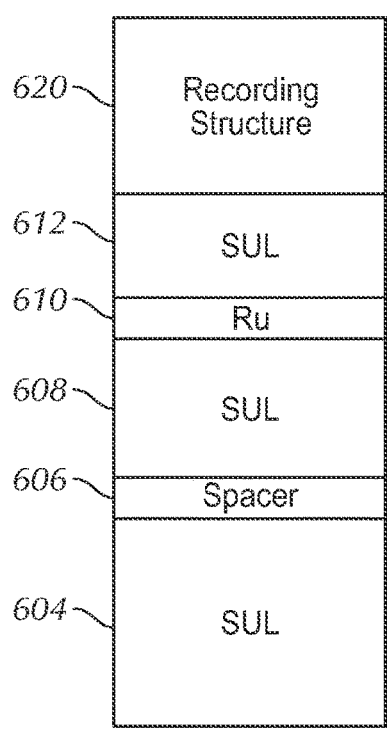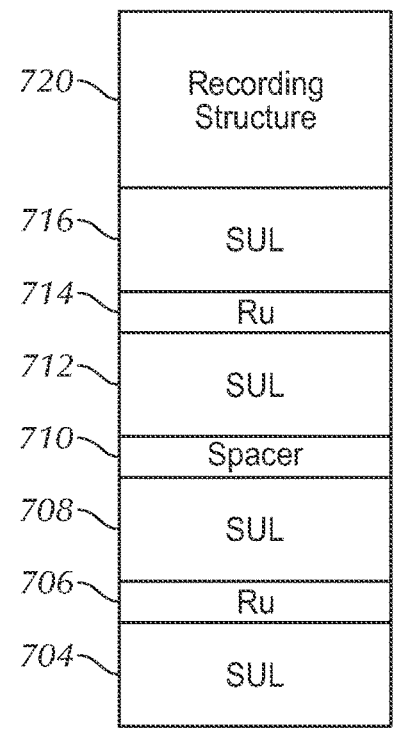
FIG. 6
FIG. 7

ANTIFERROMAGNETIC COUPLING LAYERS

FIELD

The invention relates generally to magnetic recording media, and more particularly to methods and media that increase writability and reduce unintentional erasure of a recording media.

BACKGROUND

Magnetic storage media are widely used in various applications, particularly in the computer industry for data/information storage and retrieval applications, as well as for storage of audio and video signals. Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. Efforts are continually made with the aim of increasing the areal recording density, i.e., bit density of the magnetic media.

Referring to the drawings wherein identical reference numerals denote the same elements throughout the various views, FIG. 1 illustrates a perspective view of a typical disc drive data storage system in which the present invention is useful, and also a disc recording medium and a cross section of a disc showing the difference between longitudinal and perpendicular magnetic recording. Although FIG. 1 shows one side of the disc, magnetic recording layers are usually sputter deposited on both sides of the non-magnetic aluminum substrate of FIG. 1. Also, although FIG. 1 shows an aluminum substrate, alternative embodiments include a substrate made of glass, glass-ceramic, aluminum/NiP, metal alloys, plastic/polymer material, ceramic, glass-polymer, composite materials or other non-magnetic materials.

Magnetic thin-film media, wherein a fine grained polycrystalline magnetic alloy layer serves as the active recording medium layer, are generally classified as "longitudinal" or "perpendicular," depending on the orientation of the magnetization of the magnetic domains of the grains of the magnetic material. In longitudinal media (also often referred as "conventional" media), the magnetization in the bits is flipped between lying parallel and anti-parallel to the direction in which the head is moving relative to the disc. Perpendicular magnetic recording media are being developed for higher density recording (without experiencing the thermal stability limit) as compared to longitudinal media. The thin-film perpendicular magnetic recording medium comprises a substrate and a magnetic layer having perpendicular magnetic anisotropy (Hk). In perpendicular media, the magnetization of the disc, instead of lying in the disc's plane as it does in longitudinal recording, stands on end perpendicular to the plane of the disc. The bits are then represented as regions of upward or downward directed magnetization (corresponding to the 1's and 0's of the digital data).

While perpendicular media technology provides higher areal density capability over longitudinal media, granular perpendicular magnetic recording media is being developed for further extending the areal density as compared to conventional perpendicular magnetic recording, which is limited by the existence of strong lateral exchange coupling between magnetic grains. Granular structures provide better grain isolation through oxide segregation to grain boundary, hence enhancing grain to grain magnetic decoupling and increasing media signal to noise ratio (SNR). A granular perpendicular magnetic layer contains magnetic columnar grains separated by grain boundaries comprising a dielectric material such as oxides, nitrides or carbides to decouple the magnetic grains. The grain boundaries, having a thickness of about 2 angstroms to about 30 angstroms, provide a substantial reduction in the magnetic interaction between the magnetic grains.

Perpendicular media have replaced longitudinal media in many computer-related recording applications and continue the movement toward ever-increasing areal recording densities far beyond the capability of longitudinal media. However, perpendicular media and recording technology are less well developed than facets of longitudinal media and recording technology.

As recording density continues to increase, it is necessary to make smaller grain structures to maintain the number of magnetic particles in a bit at a similar value. However, smaller grain structures are easier to erase, requiring higher anisotropy to maintain thermal stability, and making writability worse. One of the dominant issues facing perpendicular recording is unintentional erasure, particularly sidetrack erasure (STE). It is therefore increasingly difficult to make recording media that can be effectively written on the recording track by the recording head, while avoiding erasure of neighboring tracks by stray fields or limited thermal stability.

SUMMARY

Methods and media structures are described herein for increasing writability and reducing unintentional erasure of perpendicular magnetic recording media. In an embodiment, a perpendicular magnetic recording medium comprises a substrate and an overlying layer stack situated on the substrate. The layer stack comprises a magnetically soft underlayer. The underlayer is a stacked structure comprising, in overlying sequence, a first layer, a second layer being an antiferromagnetic coupling layer, and a third layer. The first layer has a high permeability region and an overlying low permeability region. The third layer has low permeability. The first layer and the third layer are unbalanced having unequal magnetic moment and are antiferromagnetically coupled. The high permeability region has a higher permeability than the low permeability region. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a simplified cross-sectional view of a portion of a perpendicular magnetic recording medium including a soft underlayer structure according to a contemporary design;

FIG. 4 is a simplified cross-sectional view of a portion of a perpendicular magnetic recording medium including an unbalanced antiferromagnetically coupled soft underlayer structure, having low permeability on a bottom region, in accordance with an embodiment of the present invention;

FIG. 5 is a simplified cross-sectional view of a portion of a perpendicular magnetic recording medium including an unbalanced antiferromagnetically coupled soft underlayer structure, having low permeability on a top region, in accordance with another embodiment of the present invention;

FIG. 6 is a simplified cross-sectional view of a portion of a perpendicular magnetic recording medium including an unbalanced antiferromagnetically coupled five layer soft underlayer structure, in accordance with another embodiment of the present invention;

FIG. 7 is a simplified cross-sectional view of a portion of a perpendicular magnetic recording medium including an unbalanced antiferromagnetically coupled seven layer soft underlayer structure, in accordance with another embodiment of the present invention;

DETAILED DESCRIPTION

Figure 1:
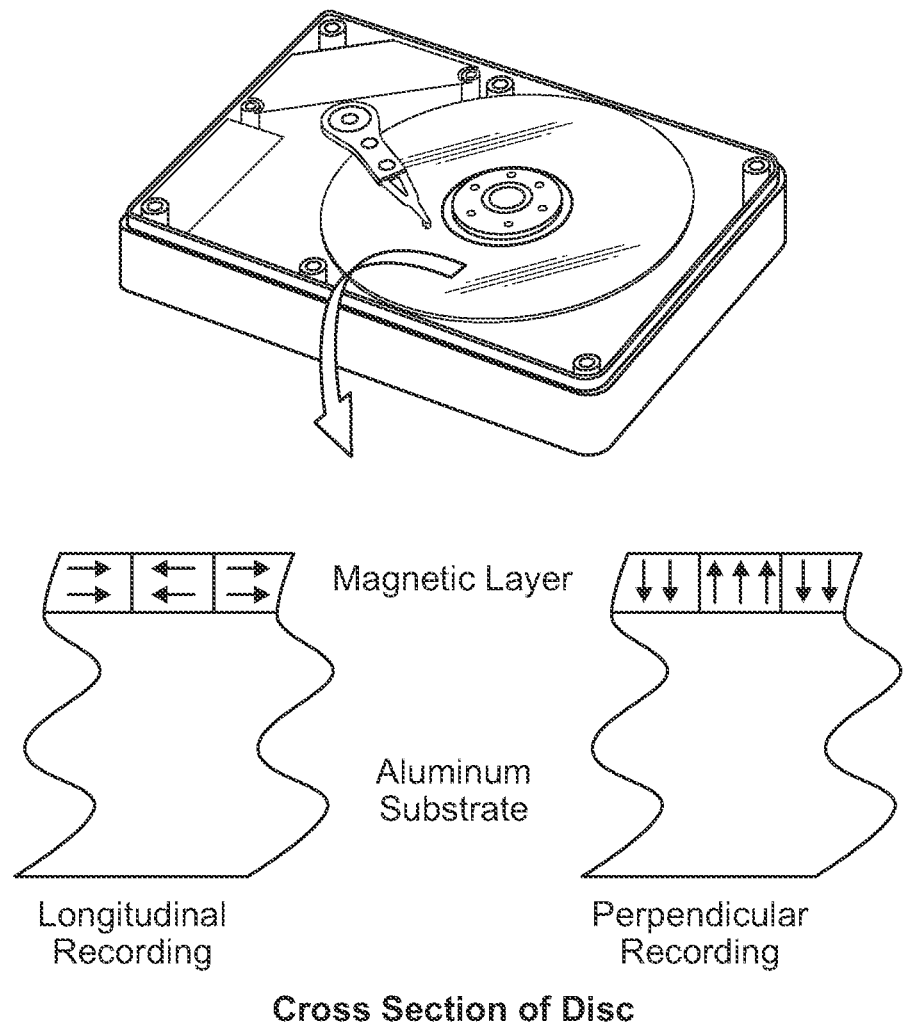
FIG. 1 is a perspective view of a typical disc drive data storage system in which the present invention is useful, and also a disc recording medium and a cross section of a disc showing the difference between longitudinal and perpendicular magnetic recording.

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

Perpendicular recording media (recording media with a perpendicular anisotropy (Hk) in the magnetic layer and magnetization forming in a direction perpendicular to the surface of the magnetic layers) have been found to be superior to longitudinal media in achieving very high bit densities without experiencing the thermal stability limit associated with the latter. In perpendicular magnetic recording media, residual or remanant magnetization is formed in a direction perpendicular to the surface of the magnetic medium, typically a layer of a magnetic material on a suitable substrate. Very high to ultra-high linear recording densities are obtainable by utilizing a "single-pole" magnetic transducer or "head" with such perpendicular magnetic media. Typically, perpendicular recording media are fabricated with polycrystalline CoCr or CoPt-oxide containing films. Co-rich areas in the polycrystalline film are ferromagnetic while Cr or oxide rich areas in the film are non-magnetic. Magnetic interaction between domains in adjacent ferromagnetic crystal grains is attenuated by nonmagnetic areas in between.

High density perpendicular recording media require carefully balanced magnetic properties including: sufficiently high anisotropy to ensure thermal stability, resist erasure, and function effectively with modern head designs; sufficiently low switching field to enable writability by the head; sufficiently low lateral exchange coupling to maintain small correlation length between magnetic grains or clusters; sufficiently high lateral exchange coupling to maintain a narrow switching field distribution (SFD); and grain-to-grain uniformity of magnetic properties sufficient to maintain thermal stability and minimum SFD.

As recording density continues to increase, it is necessary to make smaller grain structures to maintain the number of magnetic particles in a bit at a similar value. Smaller grain structures are easier to erase, requiring higher anisotropy to maintain thermal stability, and making writability worse. It is therefore increasingly difficult to make recording media that can be effectively written on the recorded track by the recording head, while avoiding erasure of neighboring tracks by stray fields or limited thermal stability.

Perpendicular magnetic recording media commonly include a hard magnetic record layer, a non-magnetic interlayer, and a soft magnetic underlayer (SUL), as described in more detail below. The SUL generally has high permeability $(\mu)$ that increases the conductance of magnetic flux, and high magnetic moment $(B_s)$ that enables conduction of large amounts of flux. Thus, the SUL helps direct the flux from the main pole of the head, through the media record layer, and back to the head return pole, increasing media writability. However, as a complication, the increase in writability applies similarly to both the recorded track and to the neighboring tracks that can thereby be erased.

Methods and media structures are described herein to increase writability and reduce unintentional erasure of perpendicular magnetic recording media. It is to be appreciated that magnetic recording media features of the discussion and claims may be utilized with disc drive memory systems, including low profile disc drive memory systems. The present invention provides an improved method for controlling variable permeability within the thin SUL layer structure, independent of bulk SUL material properties such as magnetic moment $(B_s)$ and magnetic anisotropy (Hk). Media with an improved combination of easier writability on the recorded track and difficult erasure off-track (between tracks and on neighboring tracks) is achieved, in part, by an SUL structure comprising layers having different values of permeability and magnetic thickness $(B_s*t)$.

Figure 2:
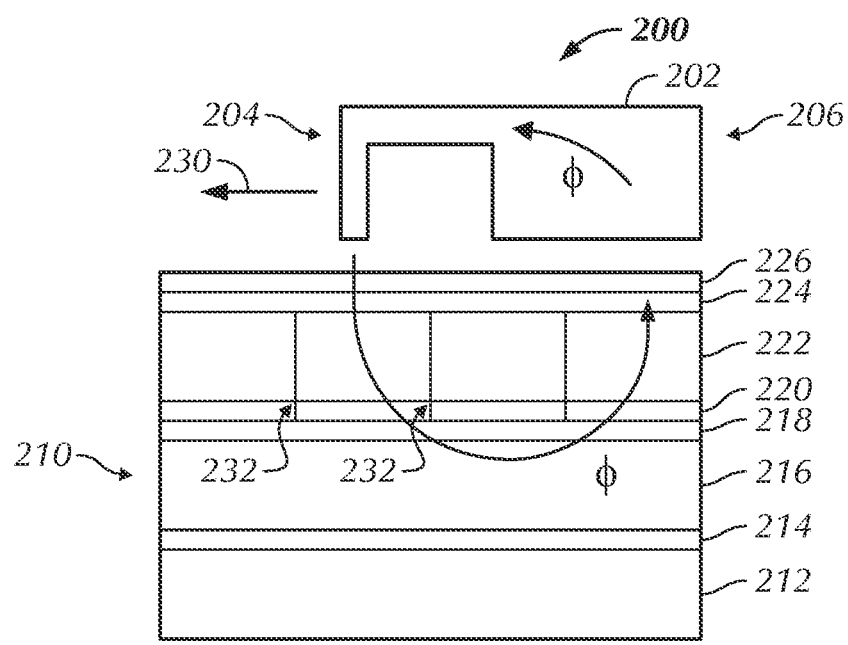
FIG. 2 is a simplified cross-sectional view of a portion of a conventional granular perpendicular magnetic recording medium, and retrieval system including a single-pole transducer head, as can be used in the disc drive data storage system as in FIG. 1.

Referring to FIG. 2, a simplified cross-sectional view is illustrated of a portion of a conventional granular perpendicular magnetic recording medium, and retrieval system including a single-pole transducer head, as can be used in the disc drive data storage system of FIG. 1. A conventional perpendicular recording system 200 is illustrated utilizing a vertically oriented magnetic medium 210. The layer stack includes a non-magnetic substrate 212, i.e., glass, aluminum (Al) or an Al-based alloy, and an optional adhesion layer 214. The optional adhesion layer, if present on the substrate surface, typically comprises a less than about 200 Angstrom thick layer of a metal or a metal alloy material such as Ti, a Ti-based alloy, Ta, a Ta-based alloy, Cr, or a Cr-based alloy. Overlying the optional adhesion layer 214 is a relatively thick (as compared with the magnetic recording layer 222) "soft" magnetically permeable underlayer 216, i.e., a magnetic layer having a relatively low coercivity below about 1 kOe, such as of a NiFe alloy (Permalloy), or a material that is easily magnetized and demagnetized. The magnetically soft underlayer (SUL) 216 serves to guide magnetic flux emanating from the head through the magnetically hard perpendicular recording layer, and to enhance writability. Overlying the underlayer 216 is an optional seed layer 218, and at least one non-magnetic interlayer 220. When present, seed layer 218 may typically include a less than about 100 angstrom thick layer of an FCC material, such as an alloy of Cu, Ag, Pt, Ni, or Au, or an amorphous or fine-grained material, such as Ta, TaW, CrTa, Ti, TiN, TiW, or TiCr.

The relatively thin intermediate layer or interlayer 220 typically comprises an about 50 to about 300 angstrom thick layer or layers of non-magnetic material(s). The interlayer stack usually includes at least one interlayer of an hcp material, such as Ru, TiCr, RuCr/CoCrPt, etc., adjacent the magnetically hard perpendicular recording layer 222. The role of the interlayer(s) is critical for obtaining good media performance. Specifically, in perpendicular magnetic recording media the interlayer(s) serve to provide:
1. control of the crystallographic orientation of the main recording layer(s);
2. control of the grain size and grain distribution of the main recording layer(s);
3. destruction of exchange coupling between magnetically hard recording layers and magnetically soft layers; and
4. physical separation between adjacent grains of the main recording layer(s), which feature is particularly desirable and important when the latter is formed by a low temperature, high gas pressure sputtering process, and/or by a reactive sputtering process, so that an oxide, i.e., Co-oxide or Cr-oxide, occurs in the boundaries between adjacent grains.

Overlying the interlayer 220 is at least one relatively thin hard perpendicular magnetic recording layer 222 with its magnetic easy axis perpendicular to the film plane. The magnetically "hard" recording layer employs a relatively high coercivity, typically about 3-8 kOe, i.e., of a cobalt-based alloy (i.e., a Co—Cr alloy such as CoCrPtB) having perpendicular anisotropy. The magnetically hard perpendicular recording layer 222 is typically comprised of an about 10 to about 25 nm thick layer(s) of Co-based alloy(s) including one or more elements selected from the group comprising Cr. Fe, Ta, Ni, Mo, Pt, W, Cr, Ru, Ti, Si, O, V, Nb, Ge, B, and Pd.

Completing the layer stack is a protective overcoat layer 224, such as of a diamond-like carbon (DLC), formed over hard magnetic layer 222. The protective overcoat 224 protects the magnetic recording layer 222 from corrosion and reduces frictional forces between the disc and a read/write head. In addition, a thin layer of lubricant 226, such as of a perfluoropolyether (PFPE) material, may be applied to the surface of the protective overcoat 224 to enhance the tribological performance of the head-disc interface by reducing friction and wear of the protective overcoat 224.

As shown by the arrows indicating the path of the magnetic flux Φ, flux Φ emanates from the main writing pole 204 of magnetic transducer head 202, enters and passes through the at least one vertically oriented, magnetically hard recording layer 222 in the region below main pole 204, enters and travels within soft magnetic underlayer (SUL) 216 for a distance, and then exits therefrom and passes through the hard magnetic recording layer 222 in the region below auxiliary pole 206 of transducer head 202. The direction of movement of perpendicular magnetic medium 210 past transducer head 202 is indicated in the figure by the arrow 230 above medium 210.

With continued reference to FIG. 2, vertical lines 232 indicate grain boundaries of polycrystalline layers 220 and 222 of the layer stack constituting medium 210. Magnetically hard main recording layer 222 is formed on interlayer 220, and while the grains of each polycrystalline layer may be of differing widths, (as measured in a horizontal direction) represented by a grain size distribution, they are generally in vertical registry, i.e., vertically "correlated" or aligned.

A currently employed way of classifying magnetic recording media is on the basis by which the magnetic grains of the recording layer are mutually separated, i.e., segregated, in order to physically and magnetically de-couple the grains and provide improved media performance characteristics. According to this classification scheme, magnetic media with Co-based alloy magnetic recording layers (i.e., CoCr alloys) are classified into two distinct types: (1) a first type, wherein segregation of the grains occurs by diffusion of Cr atoms of the magnetic layer to the grain boundaries of the layer to form Cr-rich grain boundaries, which diffusion process requires heating of the media substrate during formation (deposition) of the magnetic layer; and (2) a second type, wherein segregation of the grains occurs by formation of oxides, nitrides, and/or carbides at the boundaries between adjacent magnetic grains to form so-called "granular" media, which oxides, nitrides, and/or carbides may be formed by introducing a minor amount of at least one reactive gas containing oxygen, nitrogen, and/or carbon atoms (i.e., $O_2$, $N_2$, $CO_2$, etc.) to the inert gas (i.e., Ar) atmosphere during sputter deposition of the Co alloy-based magnetic layer. In an embodiment, the present invention may be utilized with both types of magnetic recording media.

Referring now to FIG. 3, a simplified cross-sectional view is illustrated of a portion of a perpendicular magnetic recording medium 300 including a soft underlayer structure, according to a contemporary design. The underlayer of this contemporary structure is designed with balanced antiferromagnetically coupled (AFC) layers with a relatively low permeability, as compared with a single layer SUL design. SUL 304 and SUL 308 are AFC coupled across a ruthenium (or ruthenium alloy) layer 306, and a recording layer 320 is situated above the SUL. The SUL of these contemporary designs generally have sufficiently high permeability (μ) to increase the conductance of magnetic flux, and high magnetic moment ($B_s$) to enable conduction of large amounts of flux. Thus, the SUL helps direct the flux, increasing media writability. However, as a complication, the increase in writability applies similarly to both the recorded track and to the neighboring tracks. Therefore, erasure to neighboring tracks can occur.

FIG. 4 is a simplified cross-sectional view of a portion of a perpendicular magnetic recording medium 400 including an unbalanced antiferromagnetically coupled soft underlayer structure, having low permeability on a bottom region, in accordance with an embodiment of the present invention.

The effectiveness of the SUL in increasing media writability generally depends on the SUL permeability, magnetic moment, thickness, and the amount of flux (supplied by the head) that is being carried. The flux that a thin layer of SUL can efficiently carry (with high permeability or magnetic conductivity) is $B_s t$, which is the product of saturation magnetic induction and layer thickness. Additional flux greater than $B_s t$ is not carried in the SUL preferentially to vacuum or non-magnetic material ($\mu=1$). Thus, a very thin or low magnetic moment ($B_s$) layer may carry small amounts of magnetic flux efficiently, but will not carry larger amounts of flux as efficiently. The efficiency with which an SUL will carry small amounts of flux less than $B_s t$ can also be varied by changing the value of the controllable parameter, $\mu$. The higher the value of $\mu$, the more efficiently the SUL carries flux, and the more writability enhancement is possible. The amount of flux involved in the on-track recording write process is significantly larger than the flux that causes partial erasure of neighbor tracks. Thus, in an embodiment, the present invention provides for media with enhanced resistance to erasure by designing the SUL with lower permeability when the flux is lower.

The present invention provides for control of variable permeability within the thin SUL layer structure, independent of bulk SUL material properties such as magnetic moment ($B_s$) and magnetic anisotropy (Hk). Media with an improved combination of easier writability on the recorded track and difficult erasure off-track (between tracks and on neighboring tracks) is achieved, in part, by an SUL structure comprising layers having different values of permeability and magnetic thickness ($B_s * t$).

The perpendicular magnetic recording medium 400 includes an unbalanced antiferromagnetically coupled 3-layer SUL structure with a predetermined thickness, having a low permeability bottom region, and a high permeability top region. In the example shown, the magnetic recording medium 400 comprises a substrate (not shown) and an overlying layer stack situated on the substrate. The layer stack includes, in overlying sequence from the substrate, a magnetically soft underlayer. The underlayer is a stacked structure comprising, in overlying sequence: a first layer 404, a second layer 406 being an antiferromagnetic coupling layer, and a third layer (408A and 408B). A magnetic recording layer 420 and optionally other layers including a seedlayer and interlayer are situated over the SUL. The first layer 404 has low permeability, and the third layer has a low permeability region 408A and an overlying high permeability region 408B. The first layer 404 and the third layer (408A and 408B) are unbalanced (unequal magnetic moment) and are antiferromagnetically coupled. The high permeability region 408B has a higher permeability than the low permeability region 408A.

The thickness and stacking of high and low permeability layers is controlled by the thickness of each SUL layer included in a single AFC coupled SUL structure. The SUL properties of the unbalanced AFC structure are a superposition of a single layer and equal thickness layer AFC SUL having the layer thickness of the thinnest SUL layer. More generally, the thickness of the larger moment SUL layer exhibiting low permeability properties is equal to the thickness of that layer comprising the same moment as the larger moment layer. The remaining moment of the higher moment layer exhibits permeability of the equivalent layer thickness of the single-layer SUL.

In an embodiment, the first layer 404 and the low permeability region 408A of the third layer have the same magnetic thickness ($B_s t$). Magnetic thickness ($B_s t$) is equal to the product of magnetic moment ($B_s$) and layer thickness (t). In another embodiment, the first layer 404 and the low permeability region of the third layer 408A have the same thickness (t). In an example, the first layer 404 and the low permeability region of the third layer 408A together are designed with a permeability ($\mu$) below 100 and a magnetic thickness ($B_s t$) of less than about 2 memu/cm².

In an example, $SUL_1$ (408A, 408B) is designed with moment $Bs_1 t_1$, $SUL_2$ 404 with moment $Bs_2 t_2$, where $Bs_1 t_1 > Bs_2 t_2$, and the Ru AFC coupling layer 406 thickness is optimized. $SUL_2$ 404 thickness $t_2$ has low $\mu$ AFC properties. $SUL_1$ 408A thickness $t'=Bs_2 t_2 * (Bs_2/Bs_1)$ has low $\mu$ AFC properties equal to that of $SUL_2$ 404. $SUL_1$ 408B thickness $t_1 - t'$ has high $\mu$ properties of a single layer of $SUL_1$ material having thickness $t_1 - t'$. The $SUL_1$ high $\mu$ region 408B is that region of thickness $t_1 - t'$ farthest from the AFC coupling layer 406. Thus, a dual $\mu$ SUL structure can be formed, having a low $\mu$ layer of thickness $t_2 + t'$ and a high $\mu$ layer of thickness $t_1 - t'$. The thicknesses, permeabilities, and relative position of these layers can be adjusted arbitrarily over a large range by selection of the thickness and $B_s$ of each SUL layer, and the strength of coupling of the Ru-alloy coupling layer.

FIG. 5 is a simplified cross-sectional view of a portion of a perpendicular magnetic recording medium 500 including an unbalanced antiferromagnetically coupled SUL structure, having low permeability on a top region 508. This unbalanced SUL design provides for increased writability and reduced unintentional erasure of perpendicular magnetic recording media. This design and the design as described in FIG. 4 enable permeability grading for adjustment of desired writability and erasure. In this alternative embodiment, the first layer has a high permeability region 504A and an overlying low permeability region 504B, and the third layer 508 is low permeability. The first layer (504A, 504B) and the third layer 508 are unbalanced (unequal magnetic moment) and are antiferromagnetically coupled across AFC coupling layer 506 (i.e., ruthenium or ruthenium alloy). The low permeability region 504B of the first layer and the third layer 508 are designed with the same magnetic thickness ($B_s t$). In an embodiment, the low permeability region of the first layer and the third layer together have a magnetic thickness ($B_s t$) that is less than the magnetic thickness ($B_s t$) of the high permeability region of the first layer. Magnetic thickness ($B_s t$) is equal to the product of magnetic moment ($B_s$) and layer thickness (t). In an embodiment, the low permeability region 504B of the first layer and the third layer 508 are designed with the same thickness (t). In another embodiment, the first layer (504A, 504B) and the third layer 508 have unequal magnetic thicknesses ($B_s t$).

As described above, the thicknesses and magnetic thicknesses of the SUL layers can be varied according to embodiments of the present invention. In an example, the low permeability region 504B of the first layer and the third layer 508 together have a permeability ($\mu$) below 100 and a magnetic thickness ($B_s t$) of less than about 2 memu/cm². In another example, the total thickness of the underlayer is about 400 angstroms, and the thickness of the third layer 508 is less than about 175 angstroms. In yet another example, the thickness of the third layer 508 is less than about 43.75 percent of the total thickness of the underlayer. In yet another example, the low permeability region 504B of the first layer and the third layer 508 together have a permeability ($\mu$) less than 100, and the high permeability region 504A of the first layer has a permeability ($\mu$) greater than 100. In another example, the low permeability region 504B of the first layer and the third layer 508 together have a permeability ($\mu$) less than 50, and the high permeability region 504A of the first layer has a permeability ($\mu$) greater than 200. In an example, the low permeability region 504B of the first layer and the third layer 506 together have a thickness of less than 10 nm, and a magnetic thickness ($B_s t$) of less than 1 nanoweber.

An SUL structure comprising a high permeability layer and a low permeability layer can also be constructed from a 5-layer structure including an AFC coupled SUL structure and a single layer SUL separated by a nonmagnetic spacer. FIG. 6 is a simplified cross-sectional view of a portion of a perpendicular magnetic recording medium including an unbalanced antiferromagnetically coupled five layer soft underlayer structure. Here, SUL layer 608 is antiferromagnetically coupled with SUL layer 612 across coupling layer 610. SUL layer 604 is separated by nonmagnetic spacer 606 (i.e., titanium). As an example, SUL layer 604 is designed with high permeability, and AFC coupled SUL layers 608 and 612 are designed with low permeability. In a 5-layer structure, a SUL structure may be formed with three levels of permeability, which can be graded as desired for various embodiments. For example, SUL layer 604 may have higher permeability than SUL layers 608 and 612. These AFC coupled SUL layers may then be formed into an unbalanced design as previously described, forming relatively low and high permeability regions, both of which have lower permeability than layer 604. The 5-layer structure enables three levels of permeability that can be graded as high, medium, and low, as well as just two levels of permeability, namely, high and low. Additionally, in an alternative embodiment, SUL layers 604 and 608 are AFC coupled, while SUL layer 612 is the higher permeability layer, with the spacer at layer 610.

In another embodiment, an SUL structure comprising a high permeability layer and a low permeability layer is constructed from a 7-layer structure comprising two AFC coupled structures having different Ru layer thickness and separated by a nonmagnetic spacer. FIG. 7 is a simplified cross-sectional view of a portion of a perpendicular magnetic recording medium including an unbalanced antiferromagnetically coupled seven layer soft underlayer structure. Here, SUL layer 704 is antiferromagnetically coupled with SUL layer 708 across coupling layer 706. SUL layer 712 is antiferromagnetically coupled with SUL layer 716 across coupling layer 714. SUL layers 708 and 712 are separated by nonmagnetic spacer 710. As an example, AFC coupled layers 704 and 708 are designed with low permeability, and AFC coupled SUL layers 712 and 716 are designed with high permeability. Alternatively, AFC SUL substructure 704 and 708 provide two levels of permeability, and AFC SUL substructure 712 and 716 provide two levels of permeability, establishing a total of four levels of permeability in a 7-layer SUL stack.

Figure 8:
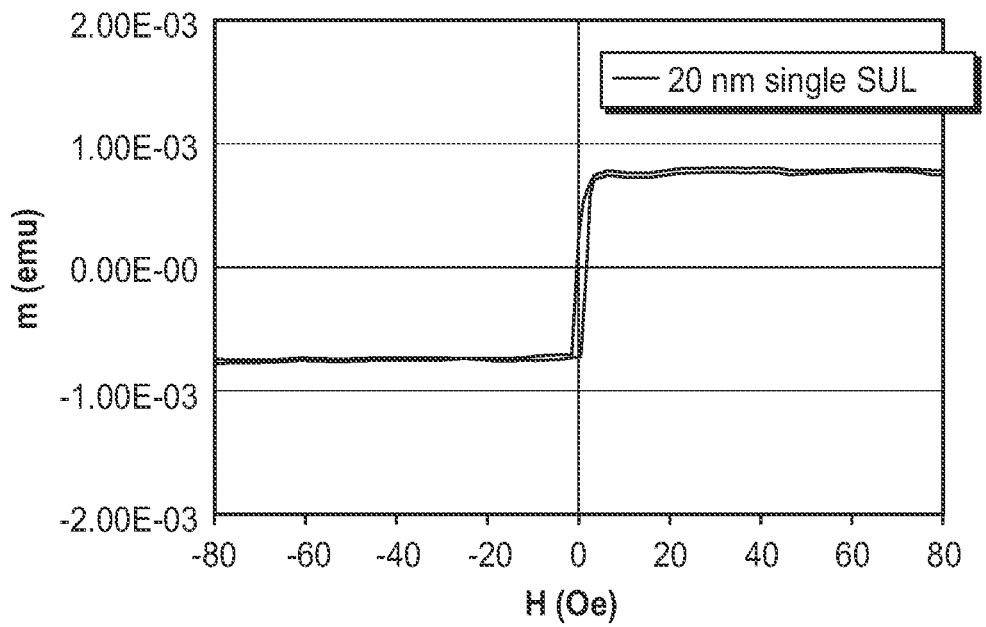
FIG. 8 is a graphical illustration of a hysteresis curve of a 20 nm single layer soft underlayer.

Turning now to FIG. 8, a graphical illustration is provided of a hysteresis curve of a 20 nm single layer SUL. Permeability of an SUL may be measured from hysteresis curves by methods such as utilizing a vibrating sample magnetometer (VSM). As shown, an applied magnetic field or coercivity H(Oe) is plotted on the x-axis against magnetization m (emu) on the y-axis. A large magnetic field is applied and the sample 20 nm single layer SUL material is driven to magnetic saturation. The average permeability ($\mu$) for the sample SUL is the Ms divided by the magnetic field at which magnetic saturation (Hsat) is reached (i.e., Ms/Hsat). The slope of the plotted points is the permeability of the SUL material.

Permeability of SUL materials having single layer permeability values as high 1000 or more can be reduced to a value below 100 or also 10 by formation of an antiferromagnetically coupled (AFC) structure including two SUL layers separated by an optimized thickness of an AFC coupling layer.

Figure 9:
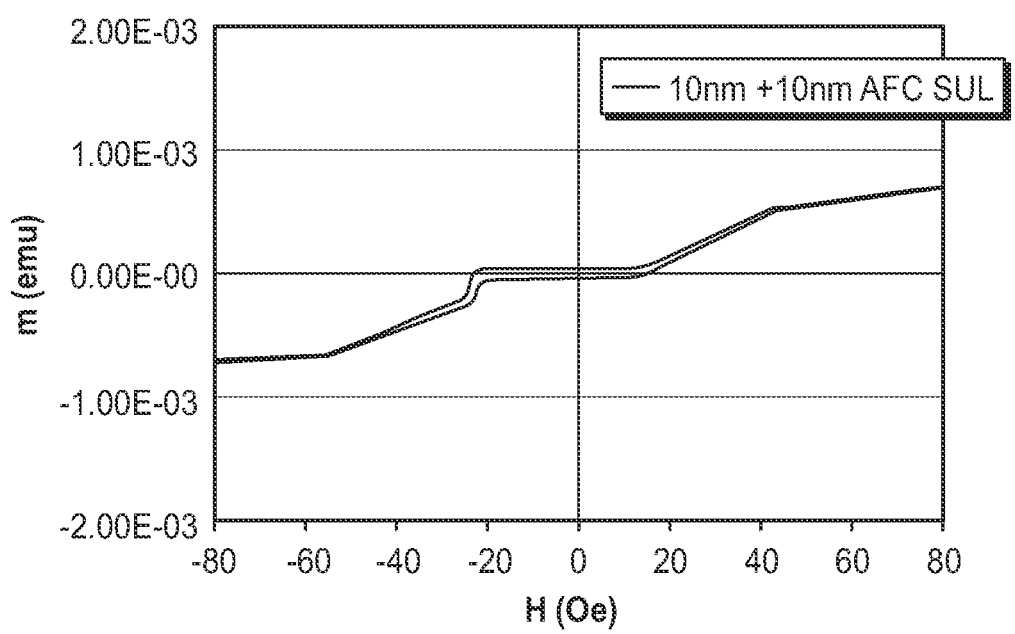
FIG. 9 is a graphical illustration of a hysteresis curve of two 10 nm antiferromagnetically coupled layers.

FIG. 9 is a graphical illustration of a hysteresis curve of two 10 nm antiferromagnetically coupled SUL layers. Again, the applied magnetic field or coercivity H(Oe) is plotted on the x-axis against magnetization m (emu) on the y-axis. The slope of the plotted points is the permeability of the SUL material.

Figure 10:
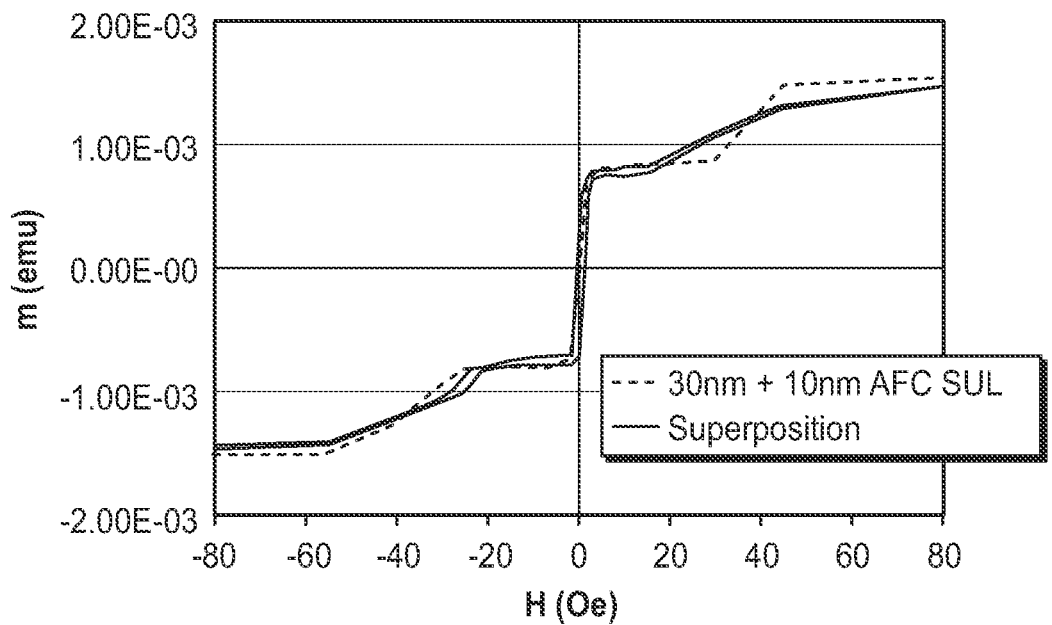
FIG. 10 is a graphical illustration of a hysteresis curve of a 30 nm soft underlayer antiferromagnetically coupled to a 10 nm soft underlayer, all with the same magnetic moment $(B_s)$ value.

FIG. 10 is a graphical illustration of a hysteresis curve of a 30 nm SUL antiferromagnetically coupled to a 10 nm SUL, all with the same magnetic moment ($B_s$) value. Again, the applied magnetic field or coercivity H(Oe) is plotted on the x-axis against magnetization m (emu) on the y-axis. The slope of the plotted points is the permeability of the SUL material. The magnetic properties of the dual $\mu$ SUL structure of FIG. 10 are constructed with a superposition of the single-layer SUL of FIG. 8 and the AFC structure of FIG. 9. The SUL structure results in 20 nm of SUL with properties of an AFC SUL and 20 nm of an SUL with properties of a single-layer SUL. Any desired thickness of high $\mu$ SUL material can be placed above or below any desired thickness of low $\mu$ SUL material in a controlled manufacturable way, according to this method.

Figure 11:
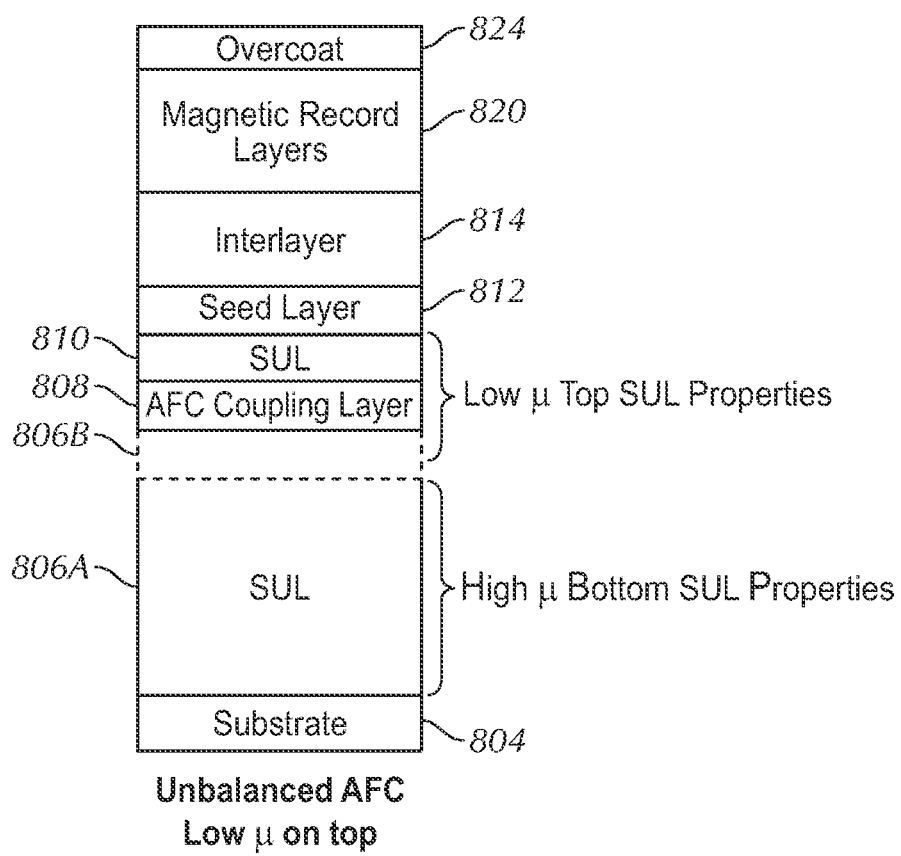
FIG. 11 is a simplified cross-sectional view of a portion of a perpendicular magnetic recording medium including an unbalanced antiferromagnetically coupled soft underlayer structure, having low permeability on a top region, in accordance with another embodiment of the present invention.

FIG. 11 is a simplified cross-sectional view of a portion of a perpendicular magnetic recording medium including an unbalanced antiferromagnetically coupled soft underlayer structure, having low permeability on a top region, in accordance with another embodiment of the present invention. The media structure includes a substrate 804, a SUL structure (described below), an overlying seedlayer 812, interlayer 814, and magnetic recording layer 820. Completing the layer stack is a protective overcoat 824, such as of a diamond-like carbon (DLC) to protect the magnetic recording layer 820 from corrosion and reduce frictional forces between the disc and a read/write head. In addition, a thin layer of lubricant (not shown), such as of a perfluoropolyether (PFPE) material, may be applied to the surface of the protective overcoat 824 to enhance the tribological performance of the head-disc interface by reducing friction and wear of the protective overcoat 824.

In an example embodiment of FIG. 11, the SUL structure includes a first soft magnetic layer 810 of magnetic thickness ($Bs_1*T_1$), an anti-ferromagnetic coupling layer 808, and a second soft magnetic layer (806A, 806B) of magnetic thickness ($Bs_2*T_2$)=($Bs_1*T_1$)+($Bs'*T'$). The magnetic layer (806A, 806B) includes a low permeability region 806B of magnetic thickness ($2Bs_1*T_1$) and a high permeability region 806A of magnetic thickness ($Bs'*T'$).

In another example embodiment of FIG. 11, the recording media SUL is designed with $Bs_1=Bs_2$, including a first soft magnetic layer 810 of magnetic thickness ($Bs*T$)$_1$, an anti-ferromagnetic coupling layer 808, and a second soft magnetic layer (806A, 806B) of magnetic thickness $BsT_2$=($Bs*(T_1+T')$). The magnetic layer (806A, 806B) includes a low permeability region 806B of magnetic thickness $2Bs*T_1$ and a high permeability region 806A of magnetic thickness $Bs*T'$.

Figure 12:
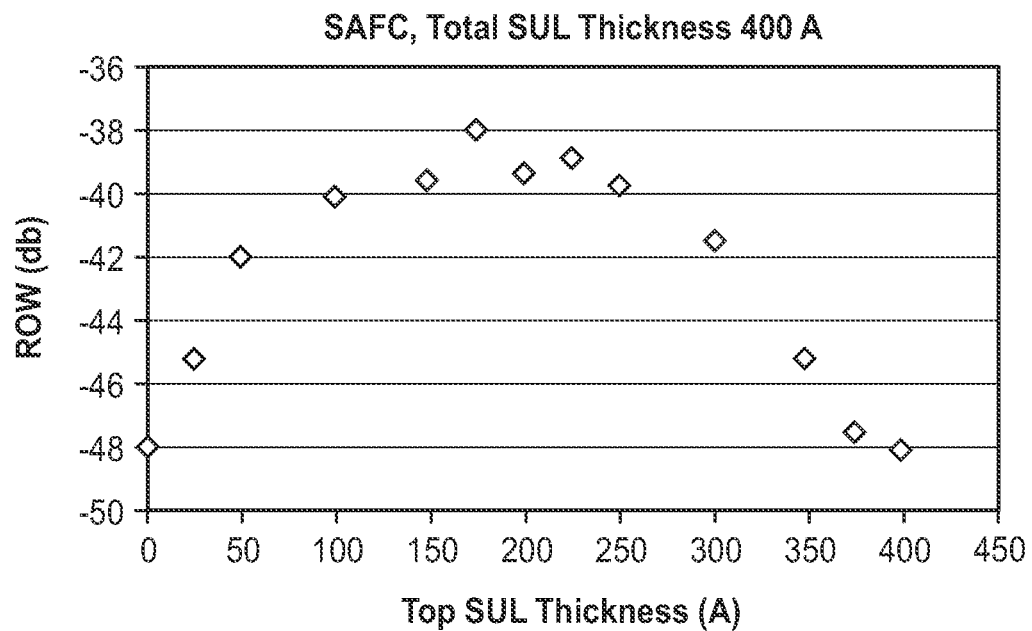
FIG. 12 is a graphical illustration of a recording metric, reverse overwrite (ROW), illustrating the ease of writing in comparison to a top region soft underlayer thickness.

FIG. 12 is a graphical illustration of a recording metric, reverse overwrite (ROW), illustrating the ease of writing in comparison to a top region soft underlayer thickness.

Data is shown for three SUL designs having the same material and total thickness: i.) a low $\mu$ AFC SUL, with a top SUL layer thickness of about 200 angstroms (such as that shown in FIG. 3); ii.) a high $\mu$ on top with a low $\mu$ bottom design, with a top SUL layer thickness greater than 200 angstroms (such as that shown in FIG. 4); and iii.) a high $\mu$ bottom with a low μ on top design, with a top SUL layer thickness less than 200 angstroms (such as that shown in FIG. 5).

In FIG. 12, top SUL thicknesses from about 25 angstrom to about 175 angstroms represent designs having low μ on top and high μ bottom. Top SUL thickness of about 200 angstroms represents a balanced design having a low μ AFC SUL. Top SUL thicknesses from about 225 angstroms to about 375 angstroms represent designs having high μ on top and low μ bottom. Top SUL thicknesses of about 0 angstroms and about 400 angstroms represent a high permeability single layer SUL design.

Figure 13:
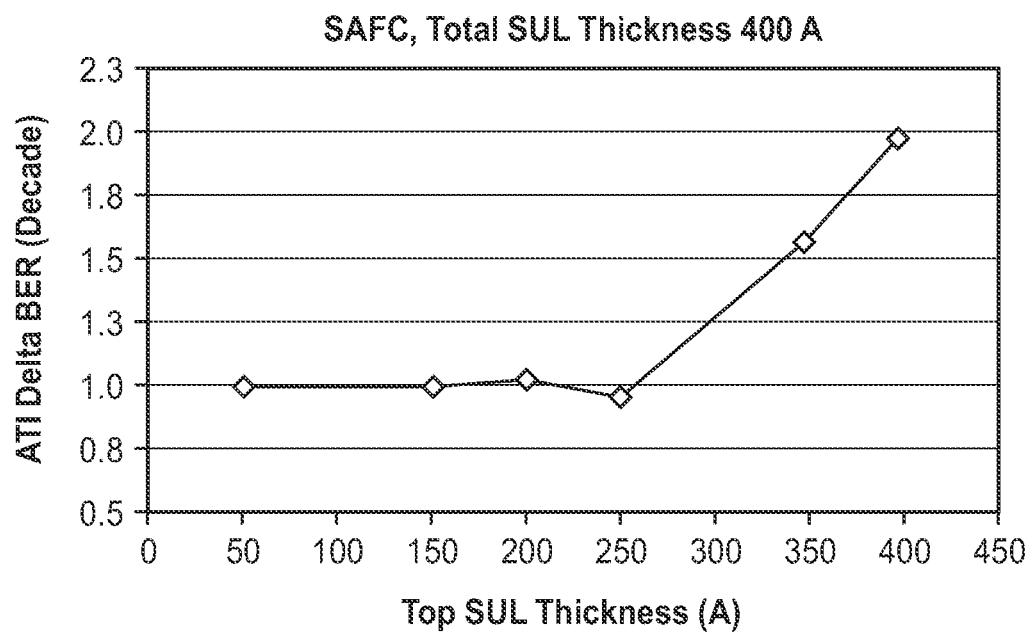
FIG. 13 is a graphical illustration of a recording metric, adjacent track interference (ATI), illustrating ease of adjacent track erasure in comparison to a top region soft underlayer thickness.

Writing to the magnetic recording media is easier with large negative values of ROW. However, the thinner top SUL layer (thicker bottom SUL layer) minimizes or avoids unintentional erasure (as illustrated in FIG. 13) by lowering the permeability of the SUL in a region nearest to the recording head and the record layer, where small amounts of erasure flux travel. FIG. 13 illustrates ease of adjacent track erasure, ATI (adjacent track interference) delta BER (bit error rate) in comparison to a top region soft underlayer thickness. Writing to the magnetic recording media is easier with large positive values of ATI. As such, the design with low μ on top (such as that shown in FIG. 5) illustrates a beneficial combination of increased ease of writing similar to high μ on top with reduced erasure similar to the low μ balanced AFC design.

Modifications and variations may be made to the disclosed embodiments while remaining within the spirit and scope of the invention. The implementations described above and other implementations are within the scope of the following claims.

We claim:

1. A system, comprising:
   a first soft magnetic layer with a first magnetic thickness ($B_s t$) wherein the first soft magnetic layer has a low magnetic permeability region and a high magnetic permeability region;
   a second soft magnetic layer with a second magnetic thickness, wherein the second magnetic thickness is different from the first magnetic thickness and equal to a magnetic thickness of the low magnetic permeability region;
   a first coupling layer oriented between the first soft magnetic layer and the second soft magnetic layer and the first coupling layer configured to antiferromagnetically couple the first soft magnetic layer and the second soft magnetic layer;
   a third soft magnetic layer with a third magnetic thickness, wherein the third magnetic thickness has a different magnitude than one or both of the first magnetic thickness and the second magnetic thickness;
   a nonmagnetic spacer layer oriented between the third soft magnetic layer and the first soft magnetic layer or the second soft magnetic layer;
   a fourth soft magnetic layer with a fourth magnetic thickness, wherein the fourth magnetic thickness has a different magnitude than the third magnetic thickness; and
   a second coupling layer oriented between the third soft magnetic layer and the fourth soft magnetic layer and providing antiferromagnetic coupling between the third soft magnetic layer and the fourth soft magnetic layer.

2. The system of claim 1, wherein the low magnetic permeability region overlies the high magnetic permeability region.

3. The system of claim 1, wherein the high magnetic permeability region overlies the low magnetic permeability region.

4. The system of claim 1, wherein the low magnetic permeability region and the second soft magnetic layer are each oriented adjacent the coupling layer.

5. The system of claim 1, wherein the first soft magnetic layer and the second soft magnetic layer have unequal thicknesses.

6. The system of claim 1, wherein the first soft magnetic layer and the second soft magnetic layer have equal magnetic moments.

7. The system of claim 1, wherein the third soft magnetic layer has a low magnetic permeability region and a high magnetic permeability region.

8. The system of claim 1, wherein the low permeability region of the first soft magnetic layer and the second soft magnetic layer together have a magnetic thickness of less than about 2 memu/cm$^2$.

9. The system of claim 1, wherein the total thickness of the first soft magnetic layer, the second soft magnetic layer, and the first coupling layer combined is between about 200 angstroms and 400 angstroms.

10. The system of claim 1, further comprising:
    a non-magnetic seed layer overlying the first soft magnetic layer, the second soft magnetic layer, the first coupling layer, the third soft magnetic layer, the non-magnetic spacer layer, the fourth soft magnetic layer, and the second coupling layer;
    an interlayer overlying the seed layer; and
    a magnetic recording layer overlying the interlayer.

11. The system of claim 10, wherein the magnetic recording layer is a magnetically hard perpendicular recording layer.

12. The system of claim 1, wherein the second soft magnetic layer has a thickness and the low permeability region has the same thickness.

13. A method comprising:
    stacking a first soft magnetic layer with a first magnetic thickness ($B_s t$) over a substrate, the first soft magnetic layer having a low magnetic permeability region and a high permeability region;
    stacking a first coupling layer over the first soft magnetic layer;
    stacking a second soft magnetic layer with a second magnetic thickness over the coupling layer, wherein the second magnetic thickness has a different magnitude than the first magnetic thickness and is equal to a magnetic thickness of the low magnetic permeability region, and the first coupling layer is configured to antiferromagnetically couple the first soft magnetic layer and the second soft magnetic layer;
    stacking a nonmagnetic spacer layer over the second soft magnetic layer;
    stacking a third soft magnetic layer with a third magnetic thickness over the nonmagnetic spacer layer, wherein the third magnetic thickness has a different magnitude than one or both of the first magnetic thickness and the second magnetic thickness;
    stacking a second coupling layer over the third soft magnetic layer; and
    stacking a fourth soft magnetic layer with a fourth magnetic thickness over the second coupling layer, wherein the fourth magnetic thickness has a different magnitude than the third magnetic thickness and the second coupling layer provides anti ferromagnetic coupling between the third soft magnetic layer and the fourth soft magnetic layer.

14. The method of claim 13, wherein the low magnetic permeability region overlies the high magnetic permeability region.

15. The method of claim 13, wherein the low magnetic permeability region and the second soft magnetic layer are each oriented adjacent the coupling layer.

16. The method of claim 13, wherein the first soft magnetic layer and the second soft magnetic layer have equal magnetic moments.

17. The method of claim 13, wherein the third soft magnetic layer has a low magnetic permeability region and a high magnetic permeability region.

18. The method of claim 13, further comprising:
stacking a non-magnetic seed layer over the fourth soft magnetic layer;
stacking an interlayer over the seed layer; and
stacking a magnetic recording layer over the interlayer.

19. The method of claim 18, wherein the magnetic recording layer is a magnetically hard perpendicular recording layer.

20. A magnetic recording medium comprising:
a soft magnetic underlayer with at least four antiferromagnetically coupled soft magnetic layers, wherein at least two of the at least four antiferromagnetically coupled soft magnetic layers have unequal magnetic moments and different magnetic thicknesses ($B_s t$), and two of the at least four antiferromagnetically coupled soft magnetic layers has a low magnetic permeability region and a high magnetic permeability region where a magnetic thickness of the low magnetic permeability region is equal to the magnetic thickness of one of the other of the at least two antiferromagnetically coupled soft magnetic layers not having a low magnetic permeability region and a high magnetic permeability region.

* * * * *